United States Patent
Aubert et al.

(10) Patent No.: US 10,086,482 B2
(45) Date of Patent: Oct. 2, 2018

(54) METHOD OF MANUFACTURING A PIECE COMPRISING SEVERAL PARTS CONNECTED TOGETHER

(71) Applicants: AIRBUS DEFENCE AND SPACE SAS, Les Mureaux (FR); ETANCHEITE ET FROTTEMENT J.MASSOT, Saint-Lubin-des-Joncherets (FR)

(72) Inventors: Guy Aubert, Saint-Lubin-des-Joncherets (FR); Stéphane Deyber, Toulouse (FR)

(73) Assignees: AIRBUS DEFENCE AND SPACE SAS, Les Mureaux (FR); ETANCHEITE ET FROTTEMENT J. MASSOT, Saint-Lubin-des-Joncherets (FR)

( * ) Notice: Subject to any disclaimer, the term of this patent is extended or adjusted under 35 U.S.C. 154(b) by 0 days.

(21) Appl. No.: 15/501,203

(22) PCT Filed: Jul. 24, 2015

(86) PCT No.: PCT/EP2015/067000
§ 371 (c)(1),
(2) Date: May 30, 2017

(87) PCT Pub. No.: WO2016/020211
PCT Pub. Date: Feb. 11, 2016

(65) Prior Publication Data
US 2017/0252877 A1   Sep. 7, 2017

(30) Foreign Application Priority Data

Aug. 4, 2014   (FR) ..................................... 14 57582

(51) Int. Cl.
*F16F 3/12* (2006.01)
*F16F 3/08* (2006.01)
(Continued)

(52) U.S. Cl.
CPC .......... *B23P 15/00* (2013.01); *B29C 45/0055* (2013.01); *B29C 45/14* (2013.01);
(Continued)

(58) Field of Classification Search
CPC ..... B23P 15/00; B29C 45/0055; B29C 45/14; B29C 69/001; B29L 2031/721;
(Continued)

(56) References Cited

U.S. PATENT DOCUMENTS 4,449,278 A * 5/1984 Geyken .................... B21K 1/02
29/527.4
6,199,801 B1   3/2001 Wilke et al.
(Continued)

FOREIGN PATENT DOCUMENTS

JP   S5731552 A   2/1982

OTHER PUBLICATIONS

International Search Reported, dated Nov. 19, 2015, from corresponding PCT Application No. PCT/EP2015/067000.

*Primary Examiner* — Bayan Salone
(74) *Attorney, Agent, or Firm* — Young & Thompson

(57) ABSTRACT

Disclosed is a method of manufacturing a final piece including several materials, the final piece being produced at least according to the steps of: inserting an elastomer (5) in at least one insertion cavity (6) of an initial piece (2) so that the elastomer (5) is in contact and fixed with the initial piece (2); then cutting the initial piece (2) in at least two distinct parts (3, 4), so that the at least two distinct parts (3, 4) are fixed together but not in contact with each other, the at least two distinct parts (3, 4) being connected together by the elasto-
(Continued)

Figure 1:
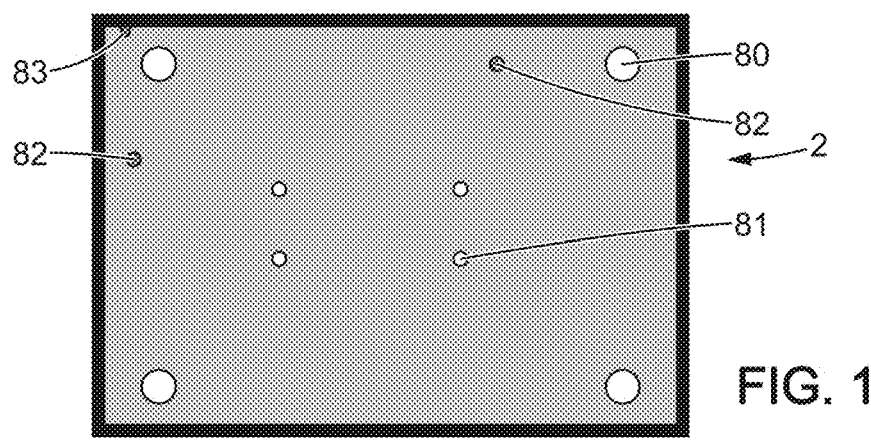

mer (5). This may be applied to manufacturing a final piece including several parts, of various natures, connected together.

20 Claims, 3 Drawing Sheets

(51) Int. Cl.
| | |
|---|---|
| *F16F 1/40* | (2006.01) |
| *F16F 15/08* | (2006.01) |
| *B23P 15/00* | (2006.01) |
| *B29C 45/00* | (2006.01) |
| *B29C 45/14* | (2006.01) |
| *B29C 69/00* | (2006.01) |
| *B64G 1/64* | (2006.01) |
| *F16F 3/087* | (2006.01) |
| *B29K 21/00* | (2006.01) |
| *B29K 705/02* | (2006.01) |
| *B29L 31/00* | (2006.01) |

(52) U.S. Cl.
CPC ........ *F16F 3/0873* (2013.01); *B29K 2021/00* (2013.01); *B29K 2705/02* (2013.01); *B29L 2031/721* (2013.01); *B64G 1/641* (2013.01); *F16F 1/40* (2013.01); *F16F 3/12* (2013.01); *F16F 15/08* (2013.01); *F16F 2226/04* (2013.01); *F16F 2230/00* (2013.01)

(58) Field of Classification Search
CPC ............ B29K 2705/02; B29K 2021/00; Y10T 29/49794; Y10T 29/49787; Y10T 29/49798; Y10T 29/49789; F16F 15/08; F16F 1/40; F16F 3/12; F16F 2230/00; B64G 1/641
USPC ....... 29/411, 412, 417; 264/138, 163; 15/33, 15/600; 267/257, 292, 294
See application file for complete search history.

(56) References Cited

U.S. PATENT DOCUMENTS

| | | | |
|---|---|---|---|
| 7,232,534 B2* | 6/2007 | Sentani | B29C 45/0055 264/138 |
| 9,163,673 B2* | 10/2015 | Kastner | F16D 3/74 |
| 9,726,248 B2* | 8/2017 | Camarasa | F16F 3/12 |
| 2007/0089949 A1 | 4/2007 | Tohyama et al. | |
| 2007/0296116 A1* | 12/2007 | Huonker | B29C 45/0055 264/263 |
| 2011/0291899 A1 | 12/2011 | Cho et al. | |
| 2013/0281219 A1* | 10/2013 | Kastner | F16D 3/74 464/87 |

* cited by examiner

METHOD OF MANUFACTURING A PIECE COMPRISING SEVERAL PARTS CONNECTED TOGETHER

TECHNICAL FIELD

The present invention concerns a method of manufacturing a final piece comprising several materials. It also concerns a piece obtained from this method.

Such method allows a user to produce very precisely a piece comprising several parts connected together, with a very high precision of relative positions. The field of the invention is more specifically but not limited to that of the making of piece of precision or requiring a good reproducibility.

STATE OF THE PRIOR ART

The state of the art of the methods for fixedly assembling two parts so as to obtain a mechanical piece is known.

However, it is complicated to position with high precision these two parts relative to each other.

The purpose of the present invention is to solve this problem with a new method of manufacturing.

Another aim of the present invention is to propose a piece that can be obtained from this method.

DISCLOSURE OF THE INVENTION

This aim is achieved with a method of manufacturing a final piece comprising several materials, the final piece being produced at least according to the steps of:
  inserting an elastomer in at least one insertion cavity of an initial piece so that the elastomer is in contact and fixed with the initial piece, then,
  cutting the initial piece in at least two distinct parts, so that the at least two distinct parts are fixed together but not in contact with each other, the at least two distinct parts being connected together by the elastomer.

The final piece may have at least one clearance cavity arranged for, once the initial piece is cut, allowing movement of the two distinct parts relative to each other by deformation of the elastomer. The at least one clearance cavity is preferably machined in the initial piece after inserting the elastomer.

Elastomer layers may be inserted in the at least one clearance cavity, each layer being in contact with one single part of the two distinct parts and being located between the two distinct parts. The elastomer layers are preferably obtained by inserting the elastomer in layer cavities.

Each layer cavity may be connected to an insertion cavity by a channel allowing an elastomer passage between these two cavities when inserting the elastomer in one of these two cavities.

The method may further comprise cutting at the interfaces between the initial piece and the elastomer. Preferably it comprises:
  cutting at the interfaces between the initial piece and the elastomer, then,
  cutting into the initial piece.

Cutting may be performed by wire electroerosion.

Preferably, the initial piece is formed by a conductive material, for example metallic.

The elastomer may comprise natural rubber.

According to the invention, the elastomer may be moulded into the initial piece.

Preferably, the elastomer is inserted in at least four distinct insertion cavities. All the surfaces of the insertion cavities and of the layer cavities may be treated to improve the link between the elastomer and the distinct part or parts.

According to the invention the cavities are holes machined across the entire initial piece.

According to another particularity of the invention, a final piece obtained from a method of manufacturing according to the invention is also proposed.

A damper (obtained via a method of manufacturing according or not to the invention, as this damper may also be obtained by another method of manufacturing and thus may be claimed independently from the method of manufacturing according to the invention) comprises:
  a set divided into three superposed planes, including a first plane, a second plane located below the first plane, and a third plane located below the second plane, this set comprising:
    a plate extending in the first plane,
    a first plate and a second plate extending in the second plane, these two plates not being in contact with each other, and
    a plate extending in the third plane,
  four elastomer mounts, including:
    a mount connecting the plate of the first plane with the first plate of the second plane,
    a mount connecting the plate of the first plane with the second plate of the second plane,
    a mount connecting the plate of the third plane with the first plate of the second plane, and
    a mount connecting the plate of the third plane with the second plate of the second plane.

The plate of the first plane and the plate of the third plane may be connected by a joining element extending across the second plane, this joining element preferably extending in a direction substantially perpendicular to the second plane. The plate of the first plane, the plate of the third plane and the joining element may constitute a single piece of a same material.

The joining element may extend between the first plate of the second plane and the second plate of the second plane. Preferably the joining element is not in contact with any of the four mounts.

The joining element may be covered with:
  an elastomer layer located between the joining element and the first plate of the second plane, and
  an elastomer layer located between the joining element and the second plate of the second plane.

Preferably none of the elastomer layers is in contact with one of the four mounts or the first plate of the second plane or the second plate of the second plane.

Furthermore for each of the four mounts, the volume of each mount may be equal to a same reference volume plus or minus 1%. In addition for each of the four mounts, the area of a mount in contact with one of the plates may be equal to a same reference area plus or minus 1%.

There is no material continuity between:
  the plate of the first plane and any plate of the second plane, and,
  the plate of the third plane and any plate of the second plane.

This set may be further divided into a fourth plane from which at least one plate extends, so that:
  the plate of the fourth plane may be connected with the first plate of the second plane by a first edge that crosses the third plane, the plate of the fourth plane may be connected with the second plate of the second plane by a second edge that crosses the third plane.

The plate of the fourth plane, the first plate of the second plane, the second plate of the second plane, the first edge, and the second edge may constitute a single piece of a same material.

Preferably the damper may comprise:
for each edge of the first edge and the second edge, respectively, an elastomer layer located between this edge and the plate of the third plane, and
an elastomer layer located between the plate of the fourth plane and the plate of the third plane.

The elastomer layers may exclusively be in contact with one or the other of the single pieces so as to form a clearance cavity between the single pieces, said a clearance cavity being arranged to allow movement of the single pieces relative to each other by deformation of the elastomer.

Each plate may be a metallic plate, preferably in aluminum.

DESCRIPTION OF FIGURES AND EMBODIMENTS

Figure 2:
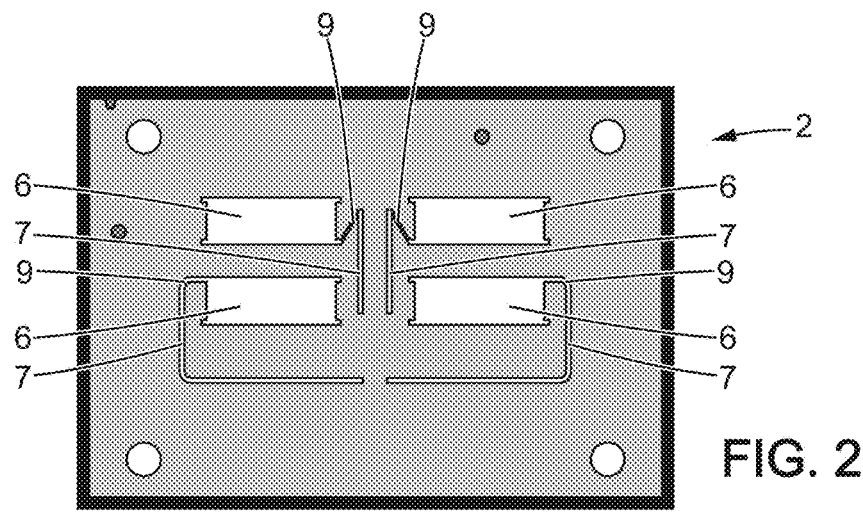
Figure 3:
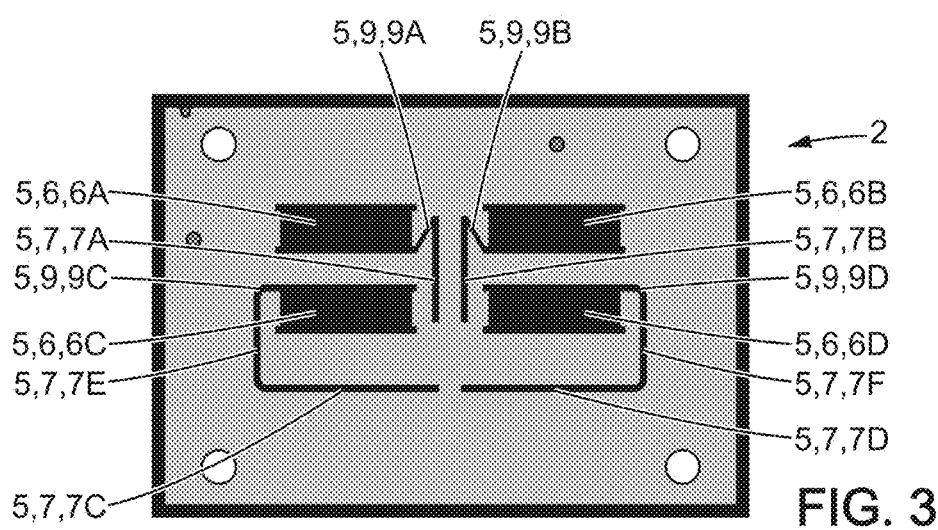
Figure 4:
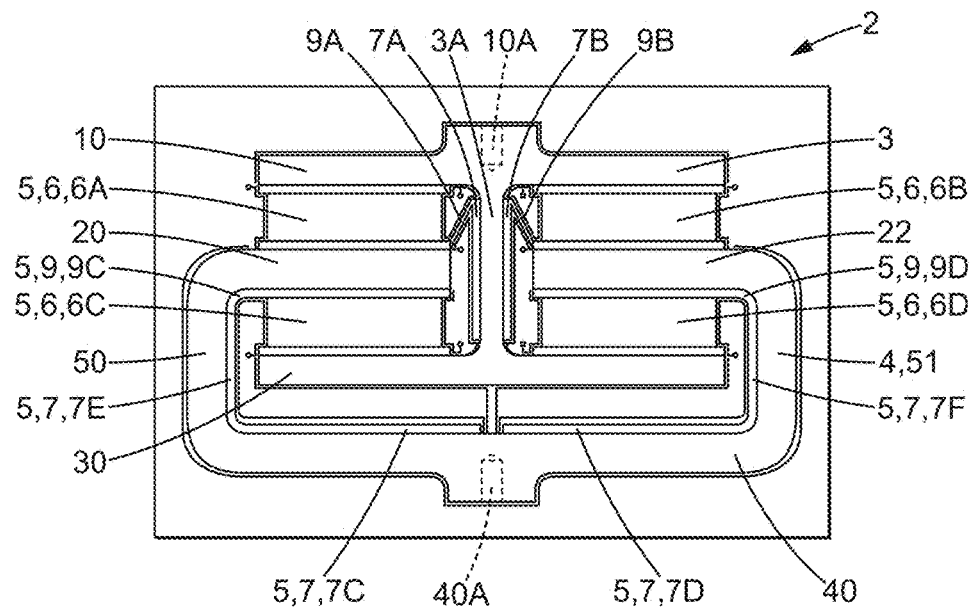
Figure 5:
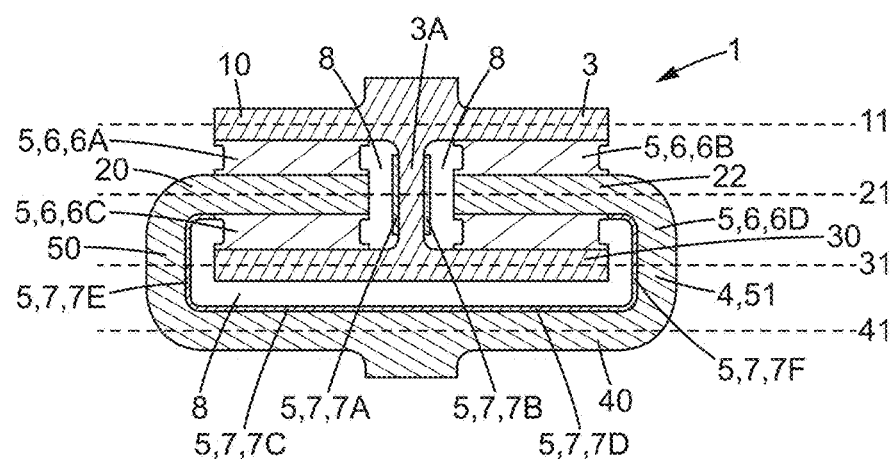
Figure 6:
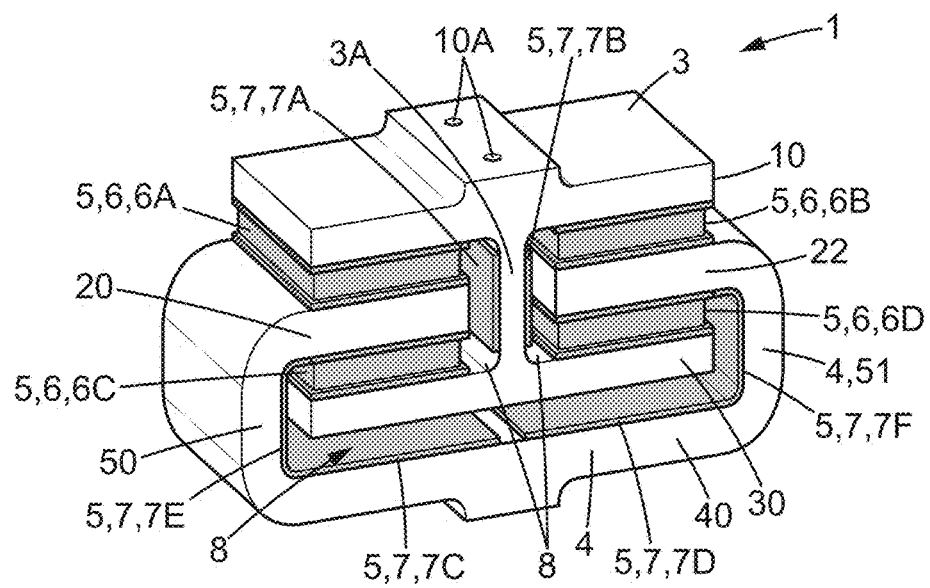
Figure 7:
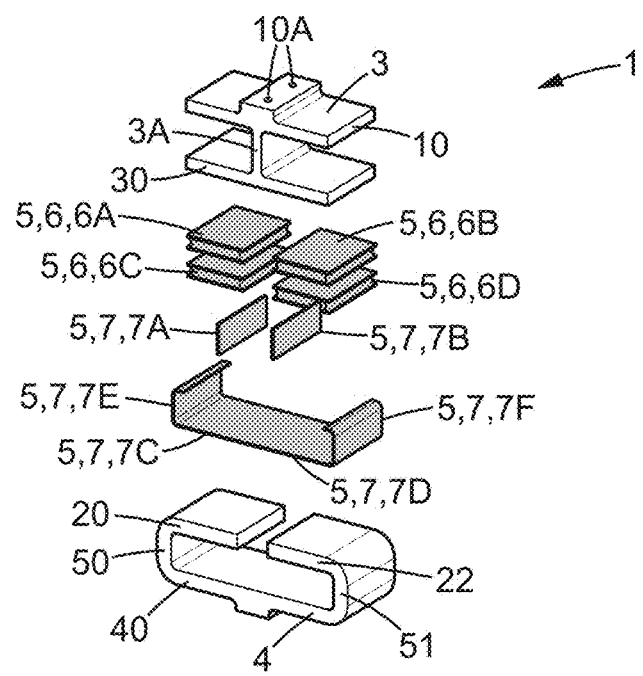

Other advantages and particularities of the invention will appear from reading the detailed description of implementations and embodiments which are not limiting, and the following attached drawings:

FIG. 1 illustrates a front view of an initial piece after a step of cutting preparation, FIG. 2 illustrates a front view of the initial piece after a step of roughing cut, FIG. 3 illustrates a front view of the initial piece after a step of moulding, FIG. 4 is a front view of a piece showing an example of lines to be followed by the cutting means during the step of finishing cut in order to obtain a final piece, FIG. 5 illustrates a front view of a final piece in cross-section, FIG. 6 illustrates a perspective view of the final piece, FIG. 7 illustrates an exploded view of the final piece.

In particular, these embodiments not being limiting, variants of the invention comprising only a selection of features described further below isolated from the other features described may be considered (even if the selection is isolated within a sentence comprising these other features), if this selection of features is sufficient to confer a technical advantage to or differentiate the invention from the state of the prior art. This selection comprises at least one feature preferably functional without structural details, and/or with only one part of the structural details if only this part is sufficient to confer a technical advantage to or differentiate the invention from the state of the prior art.

First of all, with reference to FIGS. 1 to 4, the various steps of an embodiment of the method of manufacturing a final piece 1 comprising several materials will be described. Typically the final piece 1 may comprise several parts 3, 4 and 5 which are connected together by a single support, said parts 3, 4 and 5 showing materials of various natures.

With reference to FIGS. 1 and 2, the method of manufacturing begins with a step of initial cut of an initial piece 2. A piece is voluntarily cut from a gross block in such a way that said piece is larger in size than the desired dimensions. For example a gross block may be cut to the following sizes: width 200 mm, length 265 mm, and thickness 75 mm. Then, said piece is precisely machined in order to obtain the initial piece 2 sized to the desired dimensions and with opposite faces that are perfectly parallel to each other. For example the initial piece 2, precisely machined, may show the following desired dimensions: width 179 mm, length 259 mm, and thickness 69 mm. According to a preferred embodiment, the machining is partly performed by boring and milling. In FIG. 1, the initial piece 2 is substantially rectangular; it could be in any shape for example triangular or trapezoidal.

According to a preferred embodiment, the initial piece 2 is formed in a single material, preferably in a metallic material, for example in aluminium. In particular, the initial piece 2 is formed in an electrically conductive material, i.e. with an electrical conductivity above $5 \times 10^6$ S·m$^{-1}$ (Siemens per meter).

Subsequently, various bores are produced. The initial piece 2 may show positioning bores 80 advantageously allowing both positioning and correctly maintaining the initial piece 2 during the various steps of cutting and moulding in the course of the method. Preferably, four positioning bores 80 are machined on the four corners of the initial piece 2, respectively. In addition bores may be machined in order to prepare the various cutting steps. Cavity bores 81 are produced at the locations of future cavities 6 in order to start cutting the initial piece 2 and more specifically to allow the introduction of cutting means relative to the initial piece 2. Preferably, a cavity bore 81 is machined for each cavity 6, in this case four bores 81 for cutting four cavities 6 with reference to FIGS. 1 and 2. Each bore 81 provides a starting point for each cavity 6 machining. Furthermore, alignment bores 82 may be machined into the initial piece 2. Finally, a mark 83 may be machined in order to facilitate positioning the initial piece 2 in the course of the various steps of the method. For example and with reference to FIGS. 1 to 3, the mark 83 is machined in a corner of the initial piece 2.

With reference to FIG. 2, the method of manufacturing according to the invention provides a step of so-called roughing cut of the initial piece 2. The initial piece 2 is installed on a cutting station using the positioning bores 80 and/or the mark 83. In addition the positioning bores 80 and/or the mark 83 also allow(s) redefining a precise geometric origin of the initial piece 2 and even taking the geometric origin of the assembly for the roughing cut, preferably by means of a machine. Cavities 6, 7, and 9 are cut to the desired general shapes into the initial piece 2 but correspond at this stage to cavities 6, 7, and 9 in the roughing state. Later, a step of roughing finishing cut will allow obtaining the final shapes and/or the desired dimensions of the cavities 6, 7, and 9. More specifically, the cavities 6, 7, and 9 are not machined to the exact desired dimensions i.e. they are cut so as to be voluntarily sized to dimensions smaller than the exact desired dimensions. For example, the cavities 6 may be cut so that their size shows for example a difference of 0.04 mm plus or minus 10% with respect to the exact desired dimension. In addition, the cavities 6 are judiciously cut in a precise order. These features have the advantage of countering possible deformations of the initial piece 2 by relieving stress due to material removal. According to FIG. 2, four insertion cavities 6, in rectangular shape, are cut with a view to receive by moulding another material, other than that of the initial piece 2. An order for cutting cavities 6 may be executed in a so-called "cross" order, i.e. the cavity 6 on the top left, then the cavity 6 on the bottom right, then the cavity 6 on the top right and finally the cavity 6 on the bottom left. Furthermore, the layer cavities 7, in generally rectangular shape, are cut with a view to receive another material, other than that of the initial piece 2. Each layer cavity 7 is connected to an insertion cavity 6 via a channel 9 allowing a passage between these two cavities 6, 7 during the insertion of another material other than that of the initial piece 2 in one of these two cavities 6, 7.

According to a preferred embodiment, the insertion cavities 6, the layer cavities 7 and the channels 9 are filled with a same material.

According to the invention, the initial piece 2 does not include any mobile part.

According to the embodiment represented in FIG. 2 the cavities 6, 7, and 9 are holes machined across the entire initial piece 2, i.e. they terminate on two opposites sides of the initial piece 2.

Following the so-called roughing cut, a step of roughing finishing cut allows machining the cavities 6, 7 and the channels 9 to the exact desired dimensions. The dimension difference between the roughing cut and the roughing finishing cut is then reduced, to 0.04 mm in the example given above.

According to another embodiment, the step of roughing cut and roughing finishing may be executed in a single step.

Preferably the roughing cut is performed by wire electroerosion. The diameter of the wire used is 0.3 mm but may be comprised between 0.2 and 0.4 mm. In addition the cutting wire may be made of copper with a protecting covering. This technique has the advantage of having a very good cutting precision, and of faultlessly cutting the initial piece 2 which allows limiting the stress in the initial piece 2 during cutting. Likewise, if need be, the roughing finishing cut is also performed by wire electroerosion.

Thereafter, a step of preparation of the initial piece 2 is performed so as to prepare moulding of another material, of another nature than that of the initial piece 2. For example, a synthetic and/or natural polymer and more specifically an elastomer 5 may be moulded into the initial piece 2. Elastomer refers to, in this embodiment, a polymer that has elastic properties of rubber.

Before moulding, a surface treatment is performed in order to improve the link between the materials of various natures. All the surfaces of the insertion cavities 6 and the layer cavities 7 are treated to improve the link between the elastomer 5 and the distinct part or parts 3, 4, which are not distinctly visible on FIGS. 1 to 3.

First of all, the surfaces of the initial piece 2 are prepared by a chemical treatment of so-called alodine to prevent oxidation of the aluminium surfaces. According to another embodiment, the treatment may be sandblasting the surfaces of the initial piece 2. Afterwards, the initial piece 2 is cleaned by the so-called "ultra-sound" method and then carefully dried.

Then, an adherent product is applied on all the inner surfaces of the cavities 6, 7 and the channels 9. In more concrete terms, the adherent products are diluted with respect to the recommended proportions, in particular relative to the viscosity of the obtained product for applying by precise application means on the initial piece 2. Preferably, the adherent products should be diluted so that the viscosity of the adherent product obtained is that generally recommended for the following types of applications on the initial piece 2:
"dipping" by emerging the entire piece 2 in the product, but potentially protecting some parts for example with an adhesive strip, or
by an air pressure pistol.

Then, the initial piece 2 is adhered by "dipping" on all the surfaces of the insertion cavities 6 and the layer cavities 7. The "dipping" application has the advantage of being particularly recommended to fill in the interstices with difficult access. If need be, this surplus of adherent product is sucked out. After applying the adherent products on the initial piece 2, the initial piece is left to dry with respect to the recommended drying time. Finally, the thickness of deposit from the adherent product or products is controlled on the initial piece 2. For example, the adherent products used may be products such as Chemosil™ 211 or Chemosil™ NL 411.

According to other embodiments which are not described in the following, all the surfaces of the initial piece 2 are prepared i.e. receive a surface treatment and are covered with adherent product. This feature has the advantage of, even if part of the surfaces of the initial piece 2 is not in contact with another material or another piece, saving manufacturing time.

According to another embodiment, protections, for example resists, resisting to the solvents of the adherent products, are affixed onto the areas of the initial piece that do not require to be adhered.

Following several embodiments, the preparation of the initial piece 2, for moulding another material, may be performed manually or by machines.

With reference to FIG. 3, the method of manufacturing provides a step of inserting another material, various in nature from that of the initial piece 2, in the cavities 6, 7. Preferably, an elastomer 5 is inserted in cavities 6, 7 and the channels 9. More specifically, the method of manufacturing provides an elastomer 5 inserted in at least four distinct insertion cavities 6, forming elastomer mounts 6A, 6B, 6C, and 6D. Likewise, elastomer layers 7A, 7B, 7C, 7D, 7E, 7F are obtained by inserting the elastomer 5 in the layer cavities 7. Finally, the channels 9 are filled with elastomer portions 9A, 9B, 9C and 9D.

According to a preferred embodiment, the elastomer 5 is moulded into the initial piece 2. For example, moulding may be performed by injecting the elastomer 5,
preferably in at least one layer cavity 7, then is spread by compression and transfer to all the insertion cavities 6 via channels 9 communicating between the insertion cavities 7 and the layer cavities 7, or
in at least one insertion cavity 6, then is spread by compression and transfer to all the layer cavities 7 via the channels 9 communicating between insertion cavities 6 and the layer cavities 7.

The elastomer 5 is adhered under pressure (20 MPa) and at high temperature (150° C. to 180° C.).

Preferably, the step of inserting another material, and more specifically of injection moulding, provides the substeps of:
loading a computer program for moulding in an injection press, assembling moulding tooling, connecting monitoring and/or control sensors, bringing the moulding tooling and press members to the regulation temperatures of the program,
performing one or several trial mouldings (initial piece 2 showing at least one cavity without adherent product) to check the program,
preheating a mould to 180° C. until all members of the press are stabilised,
preparing strips of elastomer material for the injection, in order to supply the injection press continuously,
preheating the initial piece 2 showing at least one cavity 6 to 140° C. during 15 min (with or without adherent product), placing the initial piece 2 showing at least one cavity 6 in the mould, checking the positioning (the tooling is designed for taking into account the dilation differentials), launch the moulding program (moulding condition: 30 min at 180° C.), unmoulding, leaving the initial piece 2 to cool with a first furnace level during 1 h at 80° C., then 12 h at room temperature, eliminating potential spillage of elastomer on the areas of the initial piece that are not adhered.

Furthermore, the step of moulding may comprise a step of vulcanization,

According to a specific embodiment, the elastomer 5 comprises natural or synthetic rubber or a silicon-type elastomer, preferably in natural rubber.

According to a preferred embodiment, the method of manufacturing allows producing a final piece 1 associating an aluminum with a mixture of natural rubber 35 ShA.

With reference to FIG. 4, the method of manufacturing provides a step of finishing cut of the initial piece 2 in order to obtain a final piece 1 comprising two parts 3, 4. The initial piece 2 is thus placed on a cutting station again. Preferably, the step of finishing cut provides the sub-steps of:

loading a cutting computer program, placing the initial piece 2 on a station following the guidance from the steps of roughing cut and roughing finishing cut, i.e. the positioning bores 80 and/or the mark 83, and allowing redefining a precise origin of the initial piece 2, taking the assembly origin, preparing a cutting wire and launching the cutting program for each piece. The cutting program should allow that the potential stress relief due to material removal only operates at the end of the cycle on less precise areas of the piece i.e. without elastomer areas to be approached and without the elastomer removal triggering positioning errors non-compensated by the positioning assembly, cutting the interfaces of the two materials, removing the cut parts, eliminating the elastomer portions 9A and 9B, eliminating the surface slags, controlling the pieces, saving the exact dimensions measured and the tolerance data of each final piece 1.

Preferably, the invention comprises a cutting order as follows:

a first phase of performing the cut at the interfaces between the initial piece 2 and the elastomer 5, i.e. at the location of the elastomer-aluminum contact so as to keep a "rigid" set while cutting the excess elastomer parts, a second phase performing the cut in the initial piece 2, i.e. removing the aluminum parts to unfix the assembly.

The step of finishing cut allows machining at least one clearance cavity 8 into the initial piece 2 and also forming the two distinct parts 3, 4.

This cutting order advantageously allows, as in the step of so-called roughing cut, preventing possible deformations of the piece by the stress relief event due to material removal.

More specifically and with reference to FIG. 4, the step of finishing cut is performed preferentially in the following cutting order, so as to limit stress (or in another order, preferentially so as to alternate a cut on the left half of FIG. 4 and a cut on the right half of FIG. 4 one after the other):

boring across the entire piece 2, between the elastomer mount 6A, the elastomer portion 9A and the future part 3, and more specifically on the outskirts of the perimeter of the elastomer mount 6A and of a future plate 10, so as to leave a passage for a cutting wire in cases of an electroerosion cut, boring across the entire piece 2, between the elastomer mount 6B, the elastomer portion 9B and the future part 3, and more specifically on the outskirts of the perimeter of the elastomer mount 6B and of the future plate 10, so as to allow a cutting wire to pass in cases of an electroerosion cut, boring across the entire piece 2, between the elastomer mount 6C, the elastomer layer 7A, and the future part 3, and more specifically on the outskirts of the perimeter of the elastomer mount 6C and of a future plate 30, so as to allow a cutting wire to pass in cases of electroerosion cut, boring across the entire piece 2, between the elastomer mount 6D, the elastomer layer 7B, and the future part 3, and more specifically on the outskirts of the perimeter of the elastomer mount 6D and of the future plate 30, in order to allow a cutting wire to pass in cases of an electroerosion cut, boring across the entire piece 2, between the elastomer portion 9A, the elastomer layer 7A and the future part 4, so as to allow a cutting wire to pass in cases of an electroerosion cut, boring across the entire piece 2, between the elastomer portion 9B, the elastomer layer 7B and the future part 4, so as to allow a cutting wire to pass in cases of an electroerosion cut, boring across the entire piece 2, between the elastomer mount 6C, the elastomer layer 7E and the future part 3, so as to allow a cutting wire to pass in cases of an electroerosion cut, boring across the entire piece 2, between the elastomer mount 6D, the elastomer layer 7F and the future part 3, so as to allow a cutting wire to pass in cases of an electroerosion cut, boring across the entire piece 2, along the left face of the elastomer mount 6A, so as to allow a cutting wire to pass in cases of an electroerosion cut, boring across the entire piece 2, along the right face of the elastomer mount 6B, so as to allow a cutting wire to pass in cases of an electroerosion cut, then cutting the piece continuously at the interface between the initial piece 2, i.e. the aluminum, and the elastomer 5 along the right face of the elastomer mount 6A then along the upper part of the elastomer portion 9A, and finally along the upper face of the layer cavity 7A, cutting the piece continuously at the interface between the initial piece 2, i.e. the aluminum, and the elastomer 5 along the left face of the elastomer mount 6B and then along the upper part of the elastomer portion 9B, and finally along the upper face of the layer cavity 7B, cutting the piece continuously at the interface between the initial piece 2, i.e. the aluminum, and the elastomer 5 along the right face of the elastomer mount 6C, cutting the piece continuously at the interface between the initial piece 2, i.e. the aluminum, and the elastomer 5 along the left face of the elastomer mount 6D, cutting the piece continuously at the interface between the initial piece 2, i.e. the aluminum, and the elastomer 5 along the lower part of the elastomer portion 9A, along the left face of the elastomer layer 7A, and finally along the lower face of the elastomer layer 7A, cutting the piece continuously at the interface between the initial piece 2, i.e. the aluminum, and the elastomer 5 along the lower part of the elastomer portion 9B, along the right face of the elastomer layer 7B, and finally along the lower part of the elastomer layer 7B, cutting the piece continuously at the interface between the initial piece 2, i.e. the aluminum, and the elastomer 5 along the left face of the elastomer mount 6C, along the lower part of the elastomer portion 9C, along the right face of the elastomer layer 7E, and finally along the upper face of the elastomer layer 7C, cutting the piece continuously at the interface between the initial piece 2, i.e. the aluminum, and the elastomer 5 along the right face of the elastomer mount 6D, along the lower part of the elastomer portion 9D, along the left face of the elastomer layer 7F, and finally along the upper face of the elastomer layer 7D, cutting the piece continuously at the interface between the initial piece 2, i.e. the aluminum, and the elastomer 5 along the left face of the elastomer mount 6A, cutting the piece continuously at the interface between the initial piece 2, i.e. the aluminum, and the elastomer 5 along the right face of the elastomer mount 6B, cutting the initial piece continuously between the elastomer layer 7A and the elastomer mount 6A, so as to unfix part of the initial piece between the elastomer mount 6A, the elastomer portion 9A, and the future plate 10.

cutting the initial piece continuously between the elastomer layer 7B and the elastomer mount 6B, so as to unfix part of the initial piece between the elastomer mount 6B, the elastomer portion 9B, and the future plate 10, cutting the initial piece continuously between the elastomer layer 7A, the elastomer mount 6C, and the future plate 30, cutting the initial piece continuously between the elastomer layer 7B, the elastomer mount 6D, and the future plate 30, cutting the initial piece continuously between the elastomer mount 6A and the elastomer mount 6C, preferably vertically along the right faces of the elastomer mounts 6A and 6C, so as to unfix part of the initial piece between the elastomer mount 6C, the future part 4 and more specifically a future plate 20, the elastomer portion 9A, the elastomer layer 7A, and the future part 3, cutting the initial piece continuously between the elastomer mount 6B and the elastomer mount 6D, preferably vertically along the left faces of the elastomer mount 6B and 6D, so as to unfix part of the initial piece between the elastomer mount 6D, the future part 4 and more specifically the future plate 22, the elastomer portion 9B, the elastomer layer 7B, and the future part 3, cutting the initial piece 2 continuously preferably vertically along the left face of the elastomer mount 6C along the left face of the future part 3 and more precisely along the left face of the future plate 30, then cutting in a substantially horizontal direction over a length at least equal to the length of the elastomer layer 7C in order to delineate the lower face of the future part 3, cutting the initial piece continuously preferably vertically along the right face of the elastomer mount 6D along the right face of the future part 3, then cutting in a substantially horizontal direction over a length at least equal to the length of the elastomer layer 7D in order to delineate the lower face of the future part 3; preferably the lower face of the future part 3 is planar and without level differences, cutting the initial piece 2 continuously preferably vertically along the left face of the elastomer layer 7D between the lower face of the part 3 and the upper face of the elastomer layer 7D, then cutting the piece 2 between the elastomer layers 7C and 7D, preferably along the inner faces, then cutting the piece 2 vertically along the right face of the elastomer layer 7C between the upper face of the elastomer layer 7C and the lower face of the future part 3, then finishing to cut along the lower face of the future part 3, cutting the piece 2 continuously along the left face of the future plate 10 and the future part 3, preferably along the left face of the elastomer mount 6A, then cutting the upper face of the future part 3 according to the desired shape, then the right face of the future plate 10 of the future part 3, preferably along the right face of the elastomer mount 6B, cutting the piece 2 continuously along the left face of the future part 4 and more precisely along the left face of a first edge 50, starting from the left face of the elastomer mount 6A, then cutting the lower face of the future part 4 according to the desired shape, and finally cutting the right face of the future part 4, and more precisely along the right face of the second edge 51, when reaching the right face of the mount 6B.

Preferably, the cutting wire has a diameter of 0.3 mm. This diameter may be increased in cases of random breakage. For example the diameter of the cutting wire may be comprised between 0.3 and 0.4 mm. The cutting wire may be made of copper with a protection covering. Furthermore, the feed speed of the cutting wire must be reduced to 0.1 mm/min in areas where the wire approaches the elastomer 5, due to the resistance to forward movement made up by the elastomer 5. The cutting wire must be strongly supported over the elastomer in areas where the elastomer is present, this support is of the order of 0.1 mm plus or minus 10% but should be adjusted based on the height to cut.

The cutting operations of the initial piece 2 are possible because the cutting wire is inserted at the cutting ends when previously cutting the interfaces between the initial piece 2 and the elastomer 5.

According to an advantageous aspect of the method described, the conductive material of parts 3, 4 is closely tied to the polymer 5. During cutting, this conductive material is almost totally affected by the wire erosion except a small part of its circumference that is supported over the polymer 5 and thus clears it from any trace of the conductive material by scrapping. This method of manufacturing allows producing pieces having a shape that becomes an integral part of the moulding tooling, and having various future elements that only form a single final piece 1. A maximum precision is obtained, the method not depending on location systems inside the mould. The moulds are also simpler to produce such that some forms are only producible with this new method of manufacturing.

Once these steps have been performed, and with reference to FIG. 5, the final piece 1 is obtained with two distinct metallic parts 3, 4 and four elastomer mounts 6A, 6B, 6C, and 6D which are perfectly cut and released from the link with the aluminum. Furthermore the elastomer layers 7A, 7B, 7C, 7D, 7E, 7F are inserted in the at least one clearance cavity 8, each layer 7A, 7B, 7C, 7D, 7E, 7F being in contact with one single part of parts 3, 4 which are now distinct and located between the two distinct parts 3, 4. According to the embodiment represented in FIG. 5. The final piece 1 showing the at least one clearance cavity 8 is arranged for, once the initial piece 2 is cut, allowing the two distinct parts 3, 4 to move relative to each other by deformation of the elastomer 5.

Finally a step of final treatment provides the application of the surface treatment giving resistance to the final piece 1 against oxidation. Thus, the final piece 1 is produced at least according to the steps of:
- inserting an elastomer 5 in at least one insertion cavity 6 of an initial piece 2 so that the elastomer 5 is in contact and fixed with the initial piece 2, then,
- cutting the initial piece 2 in at least two distinct parts 3, 4, so that the at least two distinct parts 3, 4 are fixed together but not in contact with each other, the at least two distinct parts 3, 4 being connected together by the elastomer 5.

According to the embodiment of the method described, the problems of relative positioning between parts 3 and 4 are solved, as these parts 3 and 4 were fixed together in the initial piece 2 before being separated for obtaining the final piece 1.

An example of final piece 1 obtained from the method above will now be described, with reference to FIGS. 5 to 7.

The production example is a damper 1 comprising:
a set divided into three superposed planes, including a first plane 11, a second plane 21 located below the first plane 11, and a third plane 31 located below the second plane 21, this set comprising:
- a plate 10 extending in the first plane 11,
- a first plate 20 and a second plate 22 extending in the second plane 21 these two plates 20, 22 not being in contact with each other, and
- a plate 30 extending in the third plane 31, four elastomer mounts 6A, 6B, 6C, 6D including:
- a mount 6A connecting the plate 10 of the first plane 11 with the first plate 20 of the second plane 21,
- a mount 6B connecting the plate 10 of the first plane 11 with the second plate 22 of the second plane 21,
- a mount 6C connecting the plate 30 of the third plane 31 with the first plate 20 of the second plane 21, and
- a mount 6D connecting the plate 30 of the third plane 31 with the second plate 22 of the second plane 21.

The damper 1 is produced so that the plate 10 of the first plane 11 and the plate 30 of the third plane 31 are connected by a joining element 3A extending across the second plane 21, this joining element 3A extending in a direction perpendicular to the second plane 21; the joining element 3A then extends between the first plate 20 of the second plane 21 and the second plate 22 of the second plane 21. In this way, the damper 1 is such that the plate 10 of the first plane 11, the plate 30 of the third plane 31, and the joining element 3A constitute a single piece 3 (named part 3 above) made of a same material.

The joining element 3A is covered by:
- an elastomer layer 7A located between the joining element 3A and the first plate 20 of the second plane 21, and
- an elastomer layer 7B located between the joining element 3A and the second plate 22 of the second plane 21.

However, the joining element 3A is not in contact with any of the four mounts 6A, 6B, 6C, 6D.

In addition none of the elastomer layers 7A, 7B is in contact with one of the four mounts 6A, 6B, 6C, 6D or with the first plate 20 of the second plane 21 or with the second plate 22 of the second plane 21.

According to the invention for each of the four mounts 6A, 6B, 6C, 6D, the volume of each mount is equal to a same reference volume plus or minus 1%. Likewise, for each of the four mounts 6A, 6B, 6C, 6D, the area of a mount in contact with one of the plates is equal to a same reference area plus or minus 1%.

According to a preferred embodiment, there is no material continuity between:
- the plate 10 of the first plane 11 and any plate 20, 22 of the second plane 21, and
- the plate 30 of the third plane 31 and any plate 20, 22 of the second plane 21.

The damper 1 therefore comprises this set, which is further divided into a fourth plane 41 from which at least one plate 40 extends, such that:
- the plate 40 of the fourth plane 41 is connected with the first plate 20 of the second plane 21 by a first edge 50 that crosses the third plane 31,
- the plate 40 of the fourth plane 41 is connected with the second plate 22 of the second plane 21 by a second edge 51 that crosses the third plane 31.

In addition the plate 40 of the fourth plane 41, the first plate 20 of the second plane 21, the second plate 22 of the second plane 21, the first edge 50, and the second edge 51 constitute a single piece 4 (named part 4 above) made of a same metallic material. The damper is arranged so that each plate is a metallic plate, preferably in aluminum. The volume of the single pieces 3, 4 (named parts 3, 4 further above) is of the order of 2500 cm$^3$.

Furthermore, the damper 1 may comprise:
- for each edge of the first edge 50 and the second edge 51 respectively an elastomer layer 7E, 7F located between this edge 50, 51 and the plate 30 of the third plane 31, and
- an elastomer layer 7C, 7D located between the plate 40 of the fourth plane 41 and the plate 30 of the third plane 31. According to the embodiment represented in FIGS. 5 and 7, the elastomer layers 7C and 7D are the same.

The elastomer layers 7C, 7D, 7E, 7F are exclusively in contact with one or the other of the single pieces 3, 4, preferably 4. There is a clearance cavity 8 between the single pieces 3, 4, said clearance cavity 8 being arranged to allow a movement of the single pieces 3, 4 relative to each other by deformation of the elastomer 5.

The elastomer layers 7A, 7B are used to respectively protect the plates 20, 22 when the latter are moving with respect to the piece 3 by deformation of the mounts 6A, 6B, 6C, and 6D. Likewise, the elastomer layers 7C, 7D, 7E, 7F are used to protect the plate 30 relative to the first and second edges 50, 51 and the plate 40 when the latter relatively moves with respect to the piece 4 by deformation of the mounts 6A, 6B, 6C, and 6D.

Furthermore, with reference to FIGS. 4, 6 and 7, the plate 10 comprises at least one tapping 10A arranged to secure the damper 1 to another device. Likewise, with reference to FIG. 4, the plate 40 comprises at least one tapping 40A arranged to secure the damper 1 to another device.

Of course, the invention is not limited to the examples that were just described and many developments may be brought to these examples without leaving the domain of the invention.

For example, the method of manufacturing a final piece comprising several materials of various natures may be considered with other materials, conductive or nonconductive. In the cases of lack of electric conductivity, technics of laser cutting and/or water jet(s) and/or milling or any other mean are used.

Of course, the various features, forms, variants, and embodiments of the invention may be associated together according to various combinations as long as they are not incompatible or exclusive of each other. In particular, all the variants and embodiments described previously are combinable with each other.

The invention claimed is:

1. A method of manufacturing a final piece including several materials, the method comprising:
    inserting an elastomer in at least one insertion cavity of an initial piece so that the elastomer is in contact and fixed with the initial piece; and
    after inserting the elastomer in the at least one insertion cavity, cutting the initial piece in at least two distinct parts so that the at least two distinct parts are fixed together but are not in contact with each other, the at least two distinct parts being connected to each other by the elastomer,
    wherein the final piece includes at least one clearance cavity arranged to, once the initial piece is cut, allow a movement of the two distinct parts relative to each other by deformation of the elastomer.

2. The method of manufacturing according to claim 1, wherein the at least one clearance cavity is machined into the initial piece after inserting the elastomer.

3. The method of manufacturing according to claim 1, wherein layers of the elastomer are inserted in the at least one clearance cavity, each layer being in contact with one single part of the two distinct parts and being located between the two distinct parts.

4. The method of manufacturing according to claim 3, wherein the elastomer layers are obtained by inserting the elastomer in the layer cavities.

5. The method of manufacturing according to claim 4, wherein each layer cavity is connected to an insertion cavity by a channel allowing a passage of the elastomer between the two cavities when inserting the elastomer in one of the two cavities.

6. The method of manufacturing according to claim 1, further comprising providing a cut at interfaces between the initial piece and the elastomer.

7. A method of manufacturing a final piece including several materials, the method comprising:
    inserting an elastomer in at least one insertion cavity of an initial piece so that the elastomer is in contact and fixed with the initial piece;
    providing a cut by cutting at interfaces between the initial piece and the elastomer; and
    after inserting the elastomer in the at least one insertion cavity and cutting at the interfaces, cutting the initial piece in at least two distinct parts so that the at least two distinct parts are fixed together but are not in contact with each other, the at least two distinct parts being connected to each other by the elastomer.

8. The method of manufacturing according to claim 1, wherein cutting is performed by wire electroerosion.

9. The method of manufacturing according to claim 1, wherein the initial piece is formed by a conductive material.

10. The method of manufacturing according to claim 1, wherein the elastomer comprises natural rubber.

11. The method of manufacturing according to claim 1, wherein the elastomer is molded into the initial piece.

12. The method of manufacturing according to claim 1, wherein the elastomer is inserted into at least four distinct insertion cavities.

13. The method of manufacturing according to claim 5, wherein all surfaces of the insertion cavities and of the layer cavities are treated in order to improve the link between the elastomer and the distinct part or parts.

14. The method of manufacturing according to claim 1, wherein the at least one insertion cavity is a hole machined across the entire initial piece.

15. The method of manufacturing according to claim 7, wherein the final piece includes at least one clearance cavity arranged to, once the initial piece is cut, allow a movement of the two distinct parts relative to each other by deformation of the elastomer.

16. The method of manufacturing according to claim 15, wherein the at least one clearance cavity is machined into the initial piece after inserting the elastomer.

17. The method of manufacturing according to claim 15, wherein layers of the elastomer are inserted in the at least one clearance cavity, each layer being in contact with one single part of the two distinct parts and being located between the two distinct parts.

18. The method of manufacturing according to claim 17, wherein the elastomer layers are obtained by inserting the elastomer in the layer cavities.

19. The method of manufacturing according to claim 18, wherein each layer cavity is connected to an insertion cavity by a channel allowing a passage of the elastomer between the two cavities when inserting the elastomer in one of the two cavities.

20. The method of manufacturing according to claim 15, wherein cutting is performed by wire electroerosion.

* * * * *